(12) United States Patent
Shakib et al.

(10) Patent No.: US 6,321,274 B1
(45) Date of Patent: *Nov. 20, 2001

(54) MULTIPLE PROCEDURE CALLS IN A SINGLE REQUEST

(75) Inventors: Darren Arthur Shakib; Max Loell Benson, both of Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,589

(22) Filed: Jun. 28, 1996

(51) Int. Cl.[7] ........................................ G06F 9/46
(52) U.S. Cl. ................................ 709/330; 709/328
(58) Field of Search .................. 395/682, 684, 395/680, 200.33, 200.75, 200.76; 709/304, 302, 300, 203, 245, 246, 330, 328, 310

(56) References Cited

U.S. PATENT DOCUMENTS

| | | | |
|---|---|---|---|
| 4,920,484 | * 4/1990 | Ranade | 364/200 |
| 5,046,000 | * 9/1991 | Hsu | 364/200 |
| 5,218,695 | * 6/1993 | Noveck et al. | 395/600 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,434,978 | * 7/1995 | Docker et al. | 395/200 |
| 5,442,791 | * 8/1995 | Wrabetz et al. | 395/650 |
| 5,608,870 | * 3/1997 | Valiant | 395/200.1 |
| 5,613,155 | * 3/1997 | Baldiga et al. | 395/825 |
| 5,617,570 | * 4/1997 | Russell et al. | 395/684 |
| 5,768,515 | * 6/1998 | Choquier et al. | 395/200.36 |
| 5,781,787 | * 7/1998 | Shafer et al. | 395/800 |
| 5,790,804 | * 8/1998 | Osborne | 395/200.75 |
| 5,870,558 | * 2/1999 | Branton, Jr. et al. | 395/200.54 |
| 5,875,329 | * 2/1999 | Shan | 395/680 |
| 5,889,957 | * 3/1999 | Ratner et al. | 395/200.57 |

OTHER PUBLICATIONS

T.von Eicken, et al, "Active Messages: a Mechanism for Integtated Communication and Computation", ACM, pp. 256–266, May 19, 1992.*

John Shirley et al., Microsoft RPC Programming Guide, Mar. 1995, O'Reilly & Associates, Inc., Sebastopol, California.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

* cited by examiner

Primary Examiner—Majid Banankhah
Assistant Examiner—Sue Lao
(74) Attorney, Agent, or Firm—Workman, Nydegger & Seeley

(57) ABSTRACT

Calls to a server computer in a system that includes a client computer and a server computer connected to each other by a network are processed at the client computer by receiving information identifying first and second calls to the server computer. This information is combined to form a request that is then transmitted to the server computer over the network.

29 Claims, 6 Drawing Sheets

MULTIPLE PROCEDURE CALLS IN A SINGLE REQUEST

BACKGROUND OF THE INVENTION

The invention is directed to distributed computing Systems.

A distributed computing system may include a client computer that communicates with a server computer over a network. In such a system, a client program (i.e., a program running on the client computer) causes a server program (i.e., a program running on the server computer) to perform an operation by sending a request to the server program over the network. The server program responds by performing the operation and returning any resulting data to the client program over the network.

One way of invoking an operation at the server is to pack all of the parameters for the operation together and to transmit them to the server for processing. After performing the operation, the server returns the data to the client in the same way.

Exchanges of requests and responses between the client and the server may be made using the Remote Procedure Call ("RPC") protocol. The RPC protocol permits the client program to communicate with the server program by making a procedure call to the server program. RPC software running on the client computer automatically transmits the procedure call to the server computer. RPC software running on the server computer receives the procedure call and initiates a response by the server program. The RPC software then returns the results to the client computer.

SUMMARY OF THE INVENTION

A computer-implemented technique combines multiple procedure calls into a single request in a client-server system, such as a system using the RPC protocol. Calls that do not require an immediate response are delayed until a call needing a response is generated. At that point, the calls are packaged together and transmitted to the server. Thus, for example, calls to open an object and to mark the object as read may be delayed and transmitted with a call to read data from the object.

The technique promises to substantially reduce the number of requests transmitted from the client to the server. This reduction provides increased throughput for the client by eliminating delays associated with transmission of calls for which no response (or no immediate response) is necessary.

The reduction in the number of requests also reduces the amount of information that needs to be transmitted between the client and the server. This results in reduced bandwidth requirements between the client and the server. Each request transmitted from the client to the server includes data embodying the request (e.g., an opcode and supporting information) and overhead data (e.g., information providing data integrity and security). Accordingly, bundling, for example, three calls into a single request eliminates the transmission overhead associated with two of the calls.

Combining calls into a single request will permit more efficient operation of the server when calls are related to each other. Related calls are directed to the same set of data. The server will operate more efficiently when it can operate on the same set of data in response to several consecutive calls because it will not need to reload the set of data into memory in response to each call. By contrast, when multiple calls to the same set of data are transmitted in different requests, the server will typically serve other clients and/or perform other operations between calls and, therefore, will need to reload the set of data into memory in response to each call.

In one aspect, the technique features processing calls to a server computer in a system that includes a client computer and a server computer connected to each other by a network. Information identifying first and second calls to the server computer is received at the client computer. The client computer then combines the information identifying the two calls to form a request. Finally, the client computer transmits the request to the server computer over the network.

According to the technique, the client is the entity that generates a request and the server is the entity that processes the request. Thus, for, example, when the technique is used for communication between two systems that provide server functions (i.e., server-to-server communication), the system making the request would be the client and the system processing the request would be the server.

Implementations of the technique may include one or more of the following features.

An identifier related to results of the first call may be included in the request, and may be returned prior to receiving the information identifying the second call. The identifier may also be included in the information identifying the second call. The identifier may be a pointer to a location in which the results of the first call will be stored.

At the server computer, the technique may include processing the first call and associating results of processing the first call with the identifier. When the identifier is included in the information identifying the second call, the server computer uses the identifier to obtain the results of processing the first call. Thereafter, the server computer processes the second call using the results of processing the first call.

The information identifying the first call may include an indicator as to whether transmission of the first call may be deferred. If such an indicator is present, then the information identifying the first and second calls is combined to form a request only when the first call may be deferred.

The first call may be produced by a first process while the second call is produced by a second process. Similarly, the first and second calls may be produced by different subprocesses of a process.

The information identifying the calls may be generated in compliance with the RPC protocol. The RPC protocol is discussed, for example, in "Microsoft RPC Programming Guide", John Shirley and Ward Rosenberry, O'Reilly & Associates, Inc., Sebastopol, Calif., 1995, which is incorporated herein by reference.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
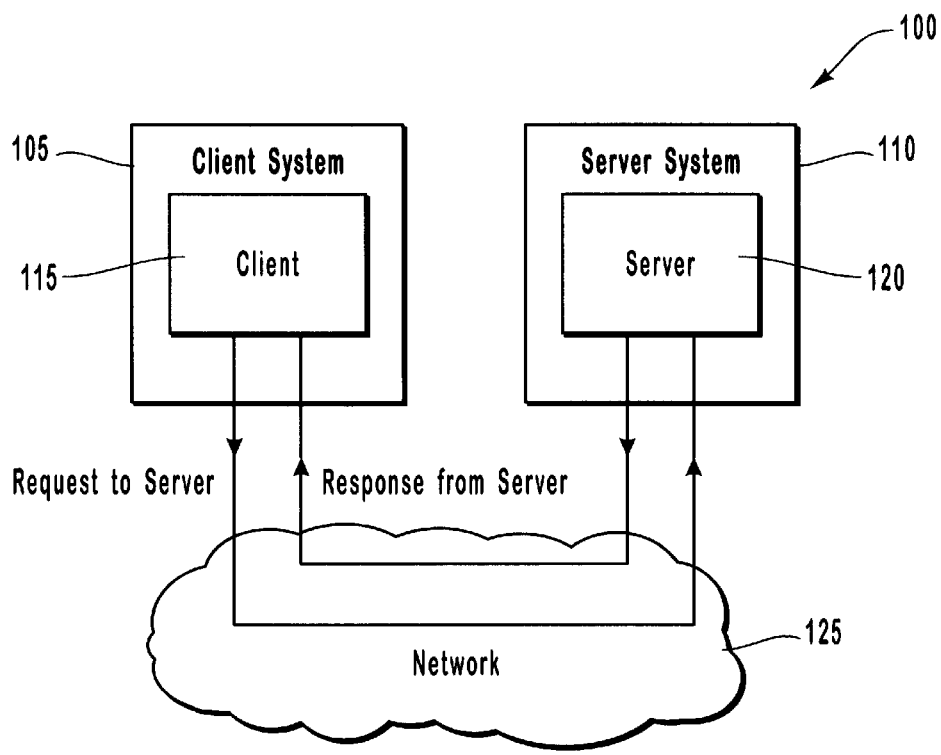
FIGS. 1 and 2 are block diagrams of a distributed client-server computer system.
Figure 2:
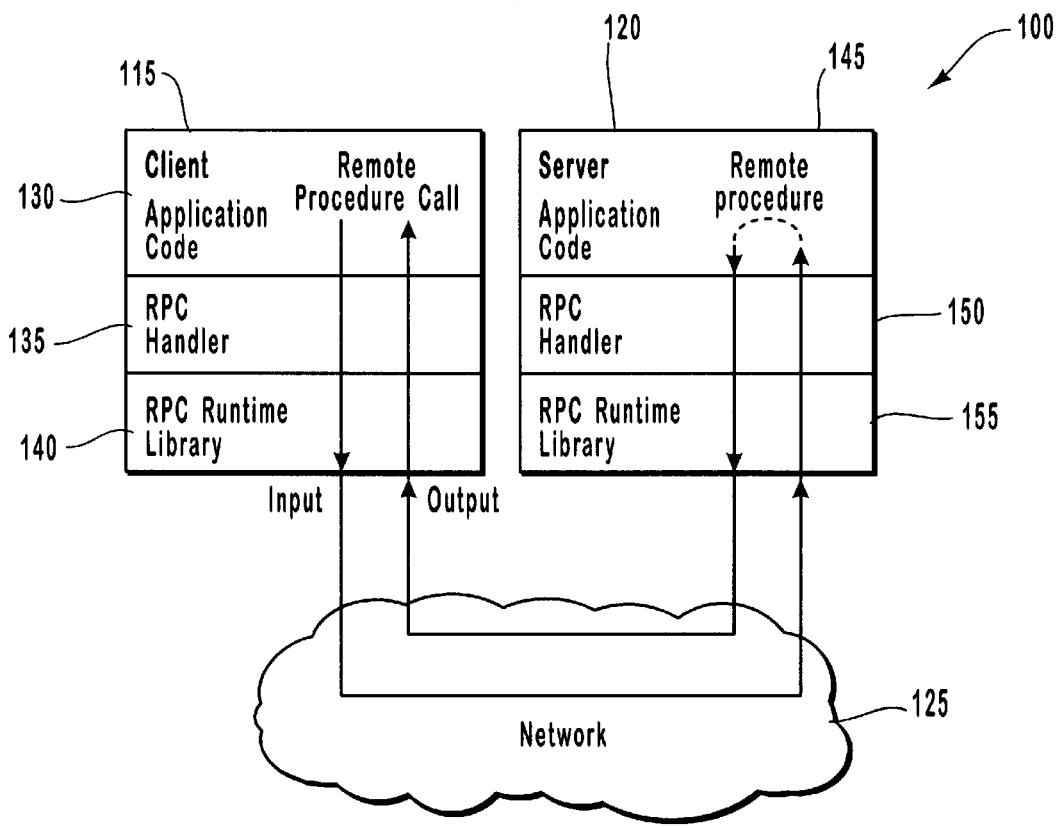

FIGS. 1 and 2 illustrate a distributed computing system 100 that includes a client system 105 and a server system 110. A client process 115 runs on the client system and a server process 120 runs on the server system. The client process 115 communicates with the server process 120 over a network 125.

The client process 115 is divided into three layers. Application code 130 at the top layer provides functionality to a user. The application code 130 communicates with the server process 120 by making remote procedure calls ("RPCs") to the server process. The application code 130 also may spawn threads that make RPCs to the server process. A thread is a subprocess that runs independently using resources (e.g., memory and address space) allocated to the application code 130.

Client RPC handler software 135 is positioned beneath the application code 130. The RPC handler software 135 receives RPCs from the application code 130 and, when appropriate, bundles the RPCs together before sending them to the server process 120 as a single request.

A standard RPC runtime library 140 is positioned beneath the RPC handler software 135. The runtime library 140 includes procedures that convert a request from the RPC handler software 135 to an appropriate format for transmission to the server system 110 and transmit the converted request over the network 125. The runtime library 140 also includes procedures that provide data integrity, data security and a transmission protocol appropriate for the network 125.

The server process 120 is similarly divided into three layers: application code 145 at the top, server RPC handler software 150 in the middle, and a standard RPC runtime library 155 at the bottom. The runtime library 155 includes procedures that receive data transmitted by the runtime library 140 and that process the received data to extract requests. The runtime library 155 also includes procedures that pass extracted requests to the handler software 150. The runtime library 155 may be identical to the runtime library 140.

The handler software 150 extracts individual calls from a request. The handler software 150 then passes each call to the application code 145. The application code 145 performs the procedure requested in the call and returns the results, if any, to the handler software 150. Upon receiving the results for all calls of a particular request, the handler software 150 bundles the results together and transmits them to the client process 115 using the runtime library 155 and the network 125.

Figure 3A:
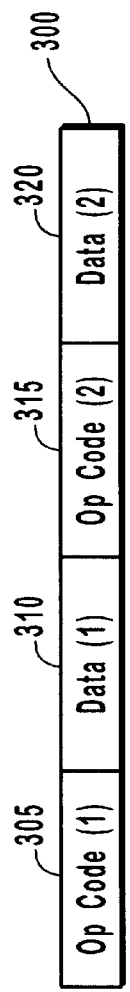
FIGS. 3A–3D are block diagrams of requests that each include multiple calls.
Figure 3B:
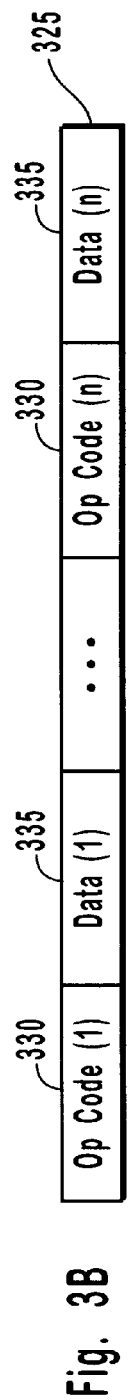

FIG. 3A illustrates a simple example of two calls that have been bundled together to form a request 300. The request 300 includes an opcode 305 and data 310 for the first call and an opcode 315 and data 320 for the second call. As illustrated in FIG. 3B, a request 325 that represents "n" different calls may include an opcode 330 and data 335 for each call.

Figure 3C:
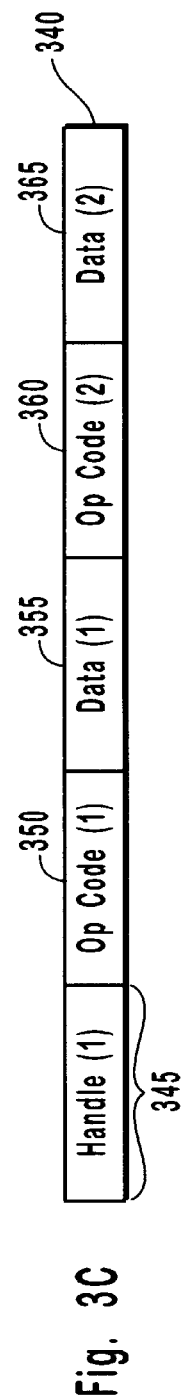
Figure 3D:
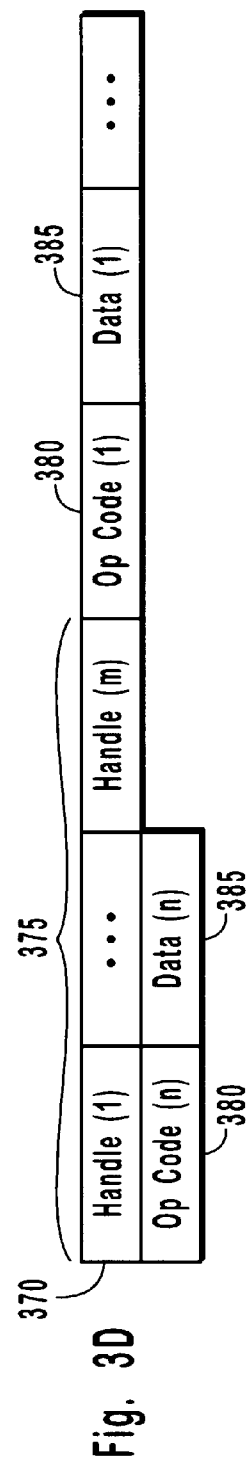

When multiple calls are related to each other, a request may include a lookup table that identifies the results of one or more calls and allows the results to be used as data by other calls within the request. For example, the request 340 illustrated in FIG. 3C includes a lookup table 345 that includes a pointer ("Handle(1)II") that points to the results of the first call. The request 340 also includes an opcode 350 and data 355 for the first call and an opcode 360 and data 365 for a second call. When the second call uses the results of the first call, the data 365 includes a reference to the "Handle (1)" pointer from the lookup table 345. As illustrated in FIG. 3D, a request 370 includes a lookup table 375 having pointers to the results of different calls. The request 370 also includes an opcode 380 and data 385 for each call.

Figure 4:
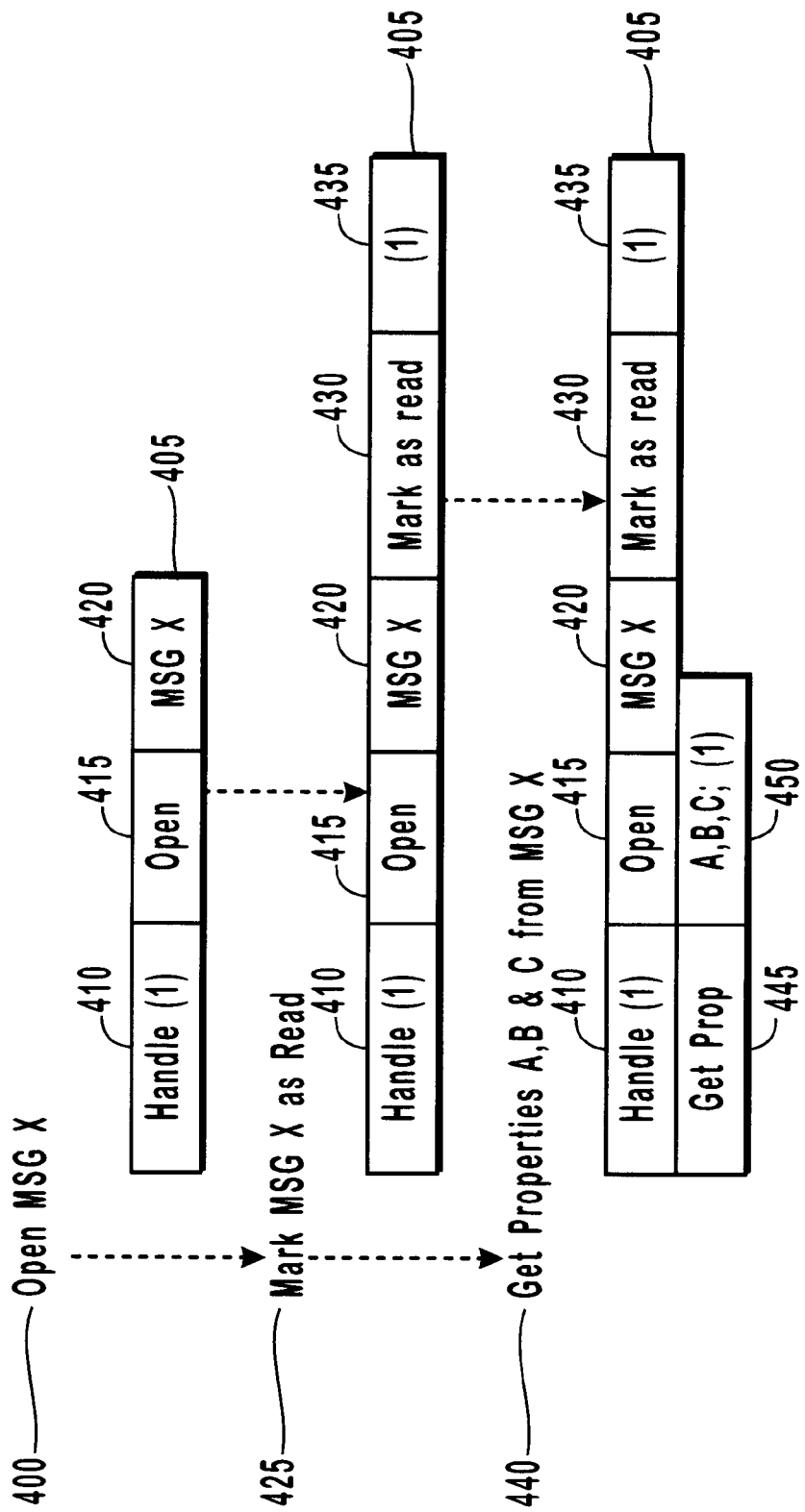
FIG. 4 illustrates a procedure for generating a request.

FIG. 4 illustrates development of a request generated by RPC handler 135 in response to a sequence of three calls from application code 130. The first call 400 is to "Open MSG X". RPC handler 135 responds to this call by generating a request 405. The request 405 includes a lookup table 410 that includes a reference ("Handle(1)") to the results of the first call. The request 405 also includes the opcode 415 ("Open") and data 420 ("MSG X") for the first call. RPC handler 135 provides "Handle(1)" to the application code 130 for use in formulating later calls and other processing.

The second call 425 is to "Mark MSG X as read". In this call, application code 130 identifies "MSG X" using "Handle(1)". RPC handler 135 responds to this call by adding to request 405 the opcode 430 ("Mark as Read") and data 435 ("(1)", corresponding to "Handle(1)") for the second call. As noted, the data 435 corresponds to the results of the first call and therefore includes a pointer to the lookup table 410.

The third call is to "Get Properties A, B, C from MSG X". Once again, application code 130 identifies "MSG X" using "Handle(1)". RPC handler 135 responds to this call by adding to request 405 the opcode 445 ("Get Properties") and data 450 ("A, B, C, (1)") for the second call. The data 450 includes an element ("(1)") that corresponds to the results of the first call and therefore includes a pointer to the lookup table 410. Since the third call requests data that, presumably, is needed by application code 130 to perform further processing, RPC handler 135 does not wait for further calls. Instead, RPC handler 135 transmits the request to the server 120 using the RPC runtime library 140 and the network 125.

Figure 5:
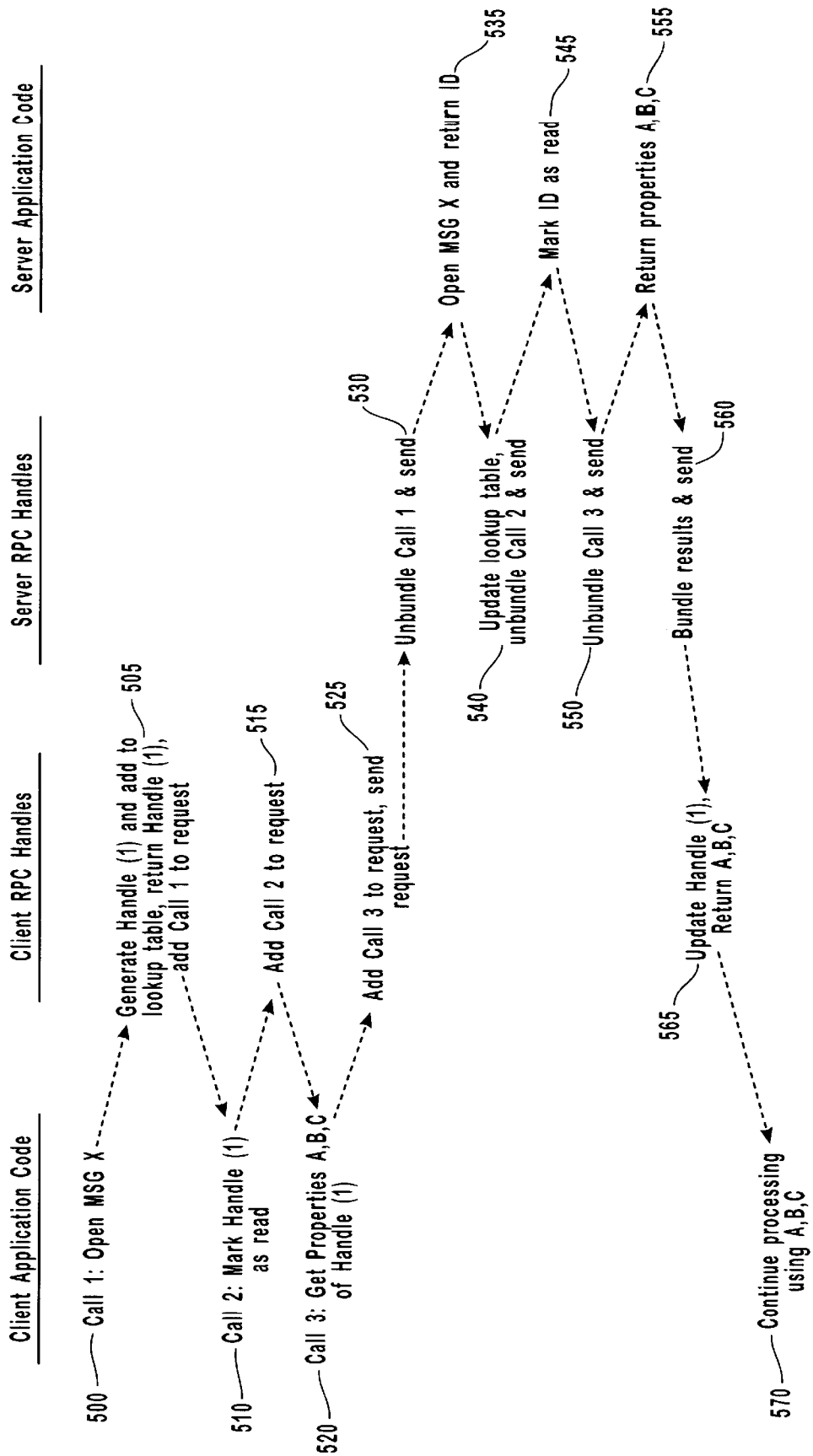
FIG. 5 illustrates the flow of information for processing a series of remote procedure calls.

FIG. 5 illustrates the flow of information between the client application code 130, the client RPC handler 135, the server RPC handler 150 and the server application code 145 for the sequence of calls illustrated in FIG. 4. Initially, client application code 130 generates the first call and transmits it to the client RPC handler 135 (step 500). As noted above, client RPC handler 135 responds by generating a pointer for the results of the first call, adding the pointer to the lookup table of the request, returning the pointer to the client application code 130, and adding the opcode and data for the first call to the request (step 505).

Next, client application code 130 generates the second call and transmits it to the client RPC handler 135 (step 510). Client RPC handler 135 responds by adding the opcode and data for the second call to the request (step 515).

Client application code 130 then generates the third call and transmits it to the client RPC handler 135 (step 520). Client RPC handler 135 responds by adding the opcode and data for the third call to the request and sending the request to the server using the runtime library 140 and the network 125 (step 525).

The server RPC handler 150 receives the request, unbundles the first call, and sends the call to the server application code 145 (step 530). The server application code 145 responds by opening MSG X and returning an identifier for the message (step 535).

The server RPC handler 150 updates the lookup table using the identifier, unbundles the second call, and sends the call to the server application code 145 (step 540). The server application code 145 responds by marking MSG X (identified by the identifier) as read and returns control to the server RPC handler 150 (step 545).

Next, the server RPC handler 150 unbundles the third call and sends the call to the server application code 145 (step 550). The server application code 145 responds by returning properties A, B and C of MSG X (identified by the identifier) (step 555). When the server RPC handler 150 receives the properties, it bundles them with the identifier for MSG X and transmits the bundled results to the client 105 using the network 125 (step 560).

Upon receiving the bundled results, the client RPC handler 135 updates the entry to which the lookup table pointer ("Handle(1)") is directed and returns properties A, B, and C of MSG X to the application code 130 (step 565). Application code 130 receives the properties and continues processing (step 570).

Figure 6:
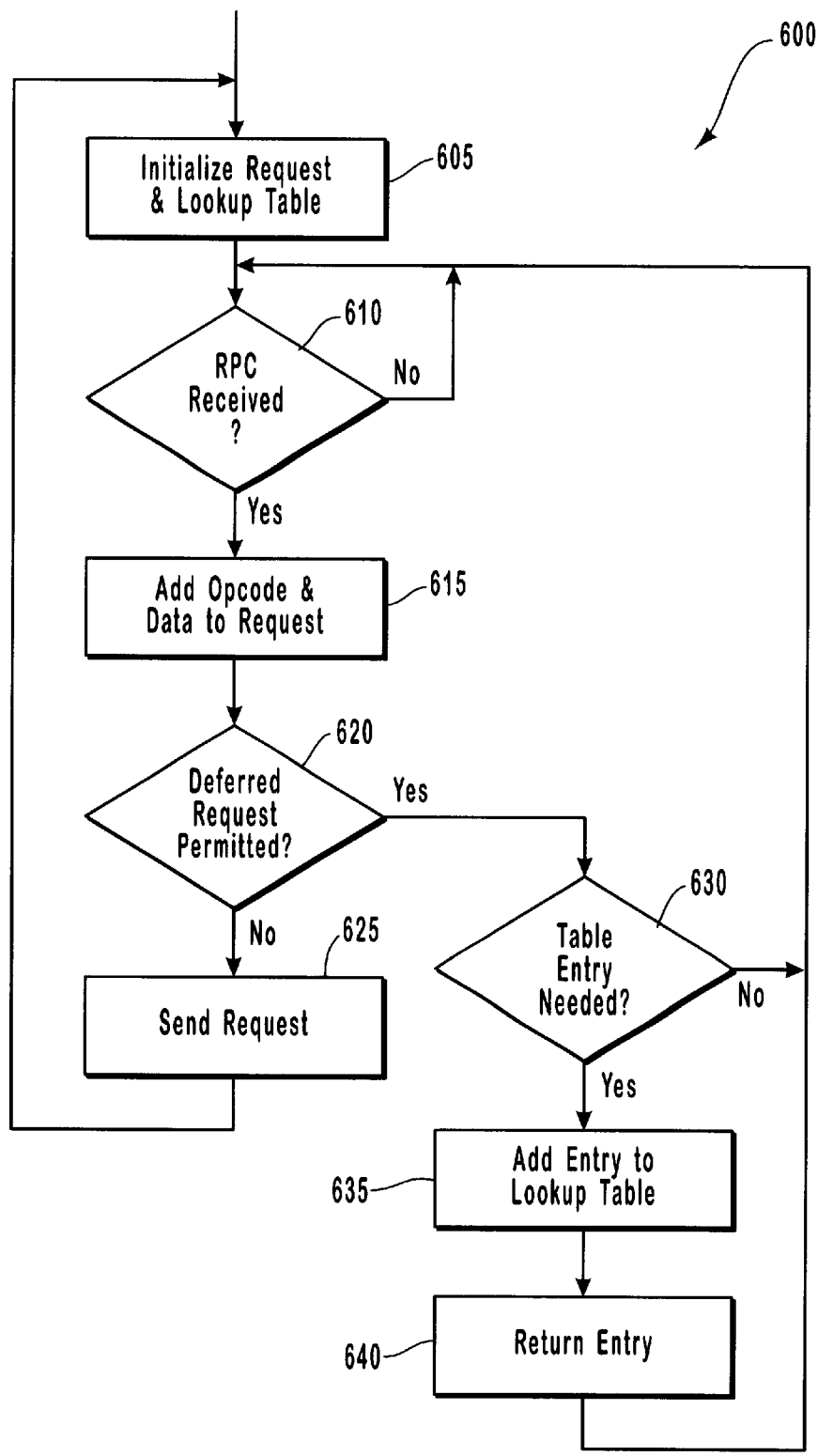
FIGS. 6 and 7 are flow charts of procedures for generating and responding to requests.

RPC handler 135 processes received RPCs according to the procedure 600 illustrated in FIG. 6. As a first step, RPC handler 135 initializes a lookup table and an associated request (step 605). Thereafter, RPC handler 135 waits for receipt of a RPC (step 610). When a RPC is received, RPC handler 135 adds the opcode and data for the RPC to the request (step 615).

Next, RPC handler 135 determines whether a deferred request is permitted for the RPC (step 620). For this purpose, each RPC includes a flag that may be set by application code 130 to indicate that a deferred request is permitted. Thus, the default condition is that deferred requests are not permitted. In general, application code 130 will set the flag when the results of the RPC are not needed in later processing. However, in some instances, it may be desirable to obtain the results of a RPC immediately even though the results of the RPC are not needed in later processing. For example, if the RPC is expected to result in an error condition, it may be preferable to process the RPC immediately so as to determine whether the error condition will occur. This will tend to minimize the effect of the error.

If the RPC may not be deferred (step 620), then RPC handler 135 sends the request (step 625). Thereafter, RPC handler initializes the request and lookup table (step 605) and waits for another RPC (step 610).

If the RPC may be deferred (step 620), then the RPC handler 135 determines whether the RPC needs to have an entry in the lookup table (step 630). The lookup table entry permits the application code 130 to refer to the results of the RPC in subsequent RPCs, when the application code does not need the actual results of the RPC in generating the subsequent RPCs. For example, application code 130 needs to refer to the results of a RPC that opens an object in subsequent RPCs that use the object, but does not need the actual results. Instead, application code 130 can include in the subsequent RPCs a pointer to the results of the current RPC. Application code 130 may indicate that a table entry is needed by setting a flag in the RPC.

If an entry in the lookup table is needed, RPC handler 135 adds the entry to the lookup table (step 635) and returns the entry to the application code 130 (step 640). The entry returned to the application code may also be referred to as a handle. The handle is a pointer to a memory location in which the result of the RPC will be stored after the RPC is completed.

After returning the entry to the application code (step 640) or determining that no entry is needed (step 630), RPC handler 135 waits for another RPC (step 610).

Figure 7:
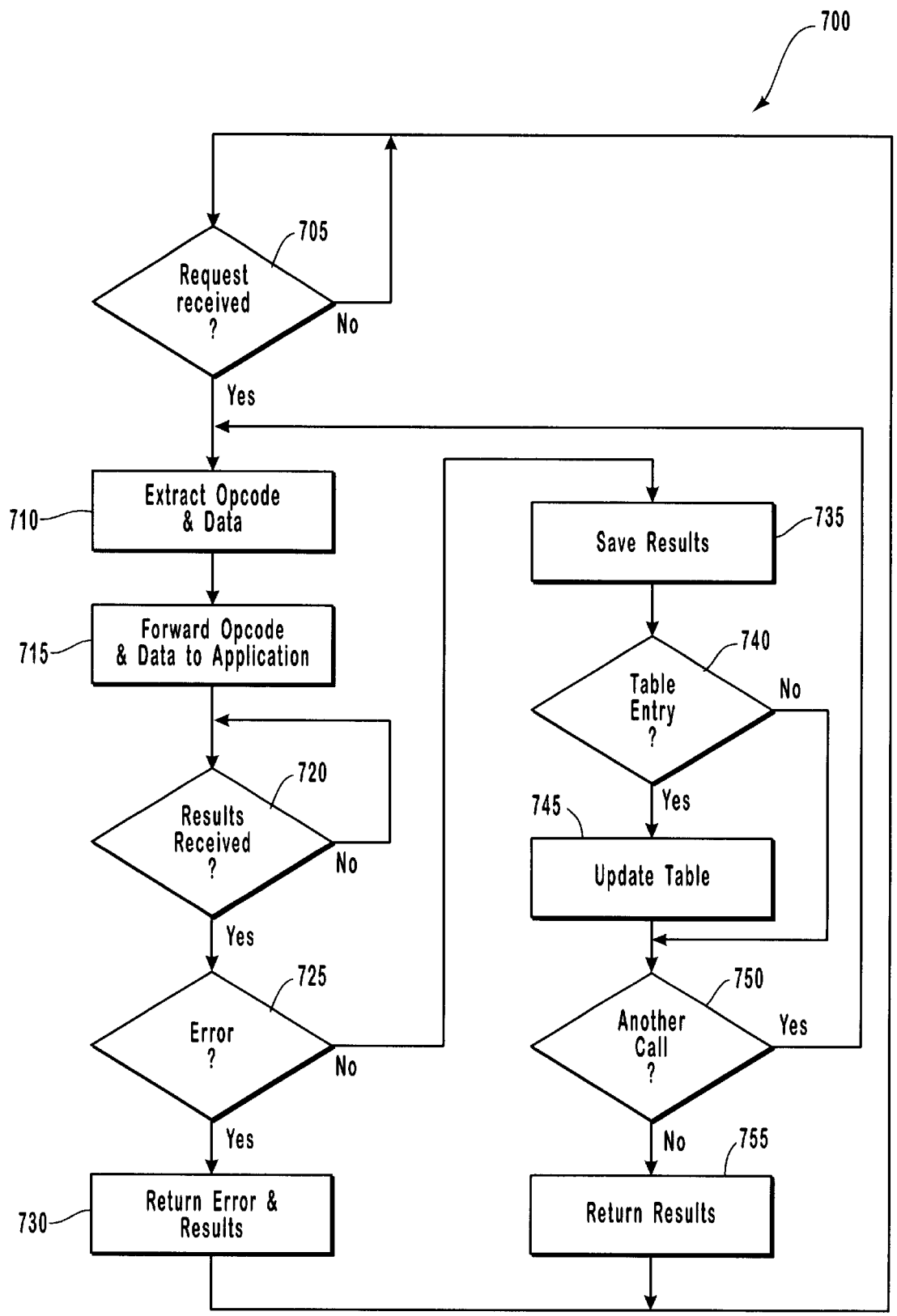

RPC handler 150 processes received requests according to the procedure 700 illustrated in FIG. 7. As a first step, RPC handler 150 waits for receipt of a request (step 705). When a request is received, RPC handler 150 extracts the opcode and data for the first RPC from the request (step 710) and forwards the opcode and data to the application code 145 (step 715). Thereafter, RPC handler 150 waits for application code 145 to return the results for the RPC (step 720).

When the results are returned, RPC handler 150 determines whether an error has occurred (step 725). If an error has occurred, RPC handler 150 returns the error along with the results of any previously completed calls (step 730). In an alternative approach, RPC handler 150 could process any calls in the request that are unaffected by the error (e.g., calls directed to an object different from the one that caused the error). RPC handler 150 would then return the results of those calls along with a description of the error.

If no error has occurred (step 725), RPC handler 150 saves the results of the call along with the opcode for the call (step 735). RPC handler 150 then determines whether the call is associated with an entry in the lookup table (step 740). If so, RPC handler 150 updates the appropriate entry in the lookup table based on the results of the call (step 745).

RPC handler 150 next determines whether the request includes another call (step 750). If there is another call, then RPC handler 150 extracts the opcode and data for that call (step 710) and repeats the process. If the request does not include another call, then RPC handler 150 returns the results of all of the calls included in the request (step 755). RPC handler 150 includes the updated lookup table with the results.

Other embodiments are within the following claims. For example, RPC handler 135 may be configured to combine calls from multiple threads into a single request. This will tend to result in requests that include more calls than are included in requests that are generated in response to calls from a single thread. Similarly, when multiple client processes are running on the client system 105, RPC handler 135 may be configured to combine calls from multiple processes into a single request.

What is claimed is:

1. In a system that includes a client computer and a server computer connected to each other by a network, the client computer having a remote procedure call handler for sending calls to the server computer, a method for combining multiple calls from the client computer to the server computer into a single request during runtime and prior to transmitting the request onto the network so as to reduce the number of requests that would otherwise be transmitted on the network, the method comprising, at the client computer:

initializing a request associated with application code operating at the client computer;

generating information identifying a first call to the server computer;

adding the information identifying the first call to the request;

by the remote procedure call handler, determining that deferring execution of the first call is permitted based on an indicator included in the first call, the indicator having been set at runtime by the application code operating at the client computer to indicate whether deferring execution of the first call is permitted;

based on the determination that deferring execution of the first call is permitted, waiting for information identifying at least one other call to the server computer to be generated without yet transmitting the request and without the first call having been transmitted between nodes of the network;

iteratively, until it is determined that deferring execution of any next call is not permitted based on an indicator included in said any next call, the indicator included in said any next call having been set at runtime by the application code operating at the client computer to indicate whether deferring execution of said any next call is permitted:

generating information identifying a next call;

by the remote procedure call handler, adding the information identifying the next call to the request without the next call having been transmitted between nodes of the network; and by the remote procedure call handler, determining whether deferring execution of the next call is permitted based on the indicator included in the next call; and upon determining that deferring execution of any next call is not permitted, transmitting the request from the client computer to the server computer over the network.

2. The method of claim 1, further comprising including in the request an identifier related to results of the first call.

3. The method of claim 2, further comprising including the identifier in the information identifying the next call that is subsequent to the first call.

4. The method of claim 2, wherein the identifier is a pointer to a location in which the results of the first call will be stored.

5. The method of claim 2, further comprising:

at the server computer, processing the first call; and at the server computer, associating results of processing the first call with the identifier.

6. The method of claim 5, further comprising:

including the identifier in the information identifying the next call that is subsequent to the first call;

at the server computer, using the identifier to obtain the results of processing the first call; and at the server computer, processing the next call that is subsequent to the first call using the results of processing the first call.

7. The method of claim 1, wherein neither the information identifying the first call nor the information identifying the next call that is subsequent to the first call is transmitted from the client computer, at which it was generated, prior to transmitting the request to the server computer over the network.

8. The method of claim 1, wherein the first call is produced by a first process or subprocess and the next call that is subsequent to the first call is produced by a second process or subprocess.

9. A computer system having a remote procedure call handler for combining multiple calls from a client computer to a server computer into a single request during runtime and prior to transmitting the request onto a network that connects the client computer to the server computer so as to reduce the number of requests that would otherwise be transmitted on the network, comprising:

a server computer;

a network connected to the server computer; and a client computer connected to the network, the client computer comprising:

means for initializing a request associated with code operating at the client computer;

means for generating information identifying a first call to the server computer;

means for adding the information identifying the first call to the request;

means, associated with the remote procedure call handler, for determining whether deferring execution of the first call is permitted based on an indicator included in the first call, the indicator having been set at runtime by the application code operating at the client computer to indicate whether deferring execution of the first call is permitted;

means for waiting, based on a determination that deferring execution of the first call is permitted, for information identifying at least one other call to the server computer to be generated without yet transmitting the request and without the first call having been transmitted between nodes of the network;

means for iteratively performing the following steps, until it is determined that deferring execution of any next call is not permitted based on an indicator included in said any next call, the indicator included in said any next call having been set at runtime by the application code operating at the client computer to indicate whether deferring execution of said any next call is permitted:

generating information identifying a next call;

by the remote procedure call handler, adding the information identifying the next call to the request without the next call having been transmitted between nodes of the network; and by the remote procedure call handler, determining whether deferring execution of the next call is permitted based on the indicator included in the next call; and means for transmitting the request from the client computer to the server computer over the network upon determining that deferring execution of any next call is not permitted.

10. The system of claim 9, wherein the client computer further comprises means for including in the request an identifier related to results of the first call.

11. The system of claim 10, wherein the client computer further comprises means for including the identifier in the information identifying the next call that is subsequent to the first call.

12. The system of claim 10, wherein the identifier is a pointer to a location in which the results of the first call will be stored.

13. The system of claim 10, wherein the server computer comprises:
   means for processing the first call; and
   means for associating results of processing the first call with the identifier.

14. The system of claim 13, wherein the client computer further comprises means for including the identifier in the information identifying the next call that is subsequent to the first call, and wherein the server computer further comprises:
   means for using the identifier to obtain the results of processing the first call; and
   means for processing the next call that is subsequent to the first call using the results of processing the first call.

15. The system of claim 9, wherein neither the information identifying the first call nor the information identifying the next call that is subsequent to the first call is transmitted from the client computer, at which it was generated, prior to transmitting the request to the server computer over the network.

16. The system of claim 9, wherein the first call is produced by a first process or subprocess and the next call that is subsequent to the first call is produced by a second process or subprocess.

17. A computer-readable storage medium, comprising instructions for use in a computer system for combining multiple calls from a client computer to a server computer into a single request during runtime and prior to transmitting the request onto a network that connects the client computer to the server computer so as to reduce the number of requests that would otherwise be transmitted on the network, the instructions causing the client computer to:
   initialize a request associated with application code operating at the client computer;
   obtain information identifying a first call to the server computer, the information identifying the first call having been generated by the client computer;
   add the information identifying the first call to the request;
   using a remote procedure call handler of the client computer, determine that deferring execution of the first call is permitted based on an indicator included in of the first call, the indicator having been set at runtime by application code operating at the client computer to indicate whether deferring execution of the first call is permitted;
   wait, based on the determination that deferring execution of the first call is permitted, for information identifying at least one other call to the server computer to be generated without yet transmitting the request and without the first call having been transmitted between nodes of the network;
   iteratively, until it is determined that deferring execution of any next call is not permitted based on an indicator included in said any next call, the indicator included in said any next call having been set at runtime by application code operating at the client computer to indicate whether deferring execution of said any next call is permitted:
      obtain information identifying a next call;
      using the remote procedure call handler, add the information identifying the next call to the request without the next call having been transmitted between nodes of the network; and
      using the remote procedure call handler, determine whether deferring execution of the next call is permitted based on the indicator included in the next call; and
   upon determining that deferring execution of any next call is not permitted, transmit the request from the client computer to the server computer over the network.

18. The computer-readable storage medium of claim 17, further comprising instructions for causing the client computer to include in the request an identifier related to results of the first call.

19. The computer-readable storage medium of claim 18, further comprising instructions for causing the client computer to include the identifier in the information identifying the next call that is subsequent to the first call.

20. The computer-readable storage medium of claim 18, further comprising instructions for causing the client computer to define the identifier as a pointer to a location in which the results of the first call will be stored.

21. The computer-readable storage medium of claim 17, wherein the instructions are such that neither the information identifying the first call nor the information identifying the next call that is subsequent to the first call is transmitted from the client computer, at which it was generated, prior to the client computer being caused to transmit the request to the server computer over the network.

22. The computer-readable storage medium of claim 17, further comprising instructions for causing a first process or subprocess running on the client computer to produce the first call and a second process or subprocess running on the client computer to produce next call that is subsequent to the first call.

23. A computer-readable storage medium, comprising instructions for use in a computer system for enabling a server computer to receive multiple calls from a client computer in a single request so as to reduce the number of requests that would otherwise be transmitted on the network, the instructions causing the server computer to:
   receive from the client computer over a network a request that includes information identifying a first call to the server computer, information identifying a second call to the server computer, and an identifier related to results of the first call, wherein:
      the information identifying the first call has been generated at the client computer, and execution of the first call has been deferred in response to a determination that deferral of the execution is permitted based on an indicator included in the first call, the indicator having been set at runtime by application code operating at the client computer to indicate whether deferring execution of the first call is permitted;
      the information identifying the second call has been generated at the client computer and without the first call having been transmitted between nodes of the network;
      the information identifying the first call and the information identifying the second call have been combined at the client computer to form the request; and
      the request has been transmitted to the server computer in response to a determination by a remote procedure call handler at the client computer that deferral of the second call is not permitted based on an indicator included in the second call, the indicator included in the second call having been set at runtime by application code operating at the client computer to indicate whether deferring execution of said second call is permitted.

24. The computer-readable storage medium of claim 23, further comprising instructions for causing the server computer to process the first call and associate results of processing the first call with the identifier.

25. The computer-readable storage medium of claim 24, wherein the identifier is included in the information identifying the second call, the computer-readable storage medium further comprising instructions for causing the server computer to:

use the identifier to obtain the results of processing the first call; and process the second call using the results.

26. The method of claim 1, wherein setting the indicator included in the first call is performed in response to determining that the results of processing the first call by the server computer can be delayed.

27. The computer system of claim 9, wherein setting the indicator included in the first call is performed in response to determining that the results of processing the first call by the server computer can be delayed.

28. The computer-readable storage medium of claim 17, wherein setting the indicator included in the first call is performed in response to determining that the results of processing the first call by the server computer can be delayed.

29. The computer-readable storage medium of claim 17, wherein setting the indicator included in the first call has been performed at the client computer in response to determining at the client computer that the results of processing the first call by the server computer can be delayed.

* * * * *